US012597746B2

(12) United States Patent
Gonzalez et al.

(10) Patent No.: US 12,597,746 B2
(45) Date of Patent: Apr. 7, 2026

(54) HIGH POWER COAXIAL ADAPTERS AND CONNECTORS

(71) Applicant: MegaPhase, LLC, Stroudsburg, PA (US)

(72) Inventors: Maddiel Gonzalez, Hopatcong, NJ (US); Stéphane Orofino, Boonton, NJ (US); Tristan Evans, Kutztown, PA (US)

(73) Assignee: MegaPhase, LLC, Stroudsburg, PA (US)

( * ) Notice: Subject to any disclaimer, the term of this patent is extended or adjusted under 35 U.S.C. 154(b) by 432 days.

(21) Appl. No.: 18/146,446

(22) Filed: Dec. 26, 2022

(65) Prior Publication Data

US 2023/0126409 A1 Apr. 27, 2023

Related U.S. Application Data

(63) Continuation of application No. 17/131,833, filed on Dec. 23, 2020, now Pat. No. 11,539,175.

(51) Int. Cl.

*H01R 24/54* (2011.01)
*H01R 13/504* (2006.01)
*H01R 13/52* (2006.01)
*H01R 103/00* (2006.01)

(52) U.S. Cl.

CPC ......... *H01R 24/542* (2013.01); *H01R 13/504* (2013.01); *H01R 13/521* (2013.01); *H01R 2103/00* (2013.01)

(58) Field of Classification Search

None

See application file for complete search history.

(56) References Cited

U.S. PATENT DOCUMENTS 4,266,844 A * 5/1981 Chelminski .......... H01R 13/523 439/453
4,335,932 A * 6/1982 Herrmann, Jr. ........ H01R 43/24 174/541
4,666,230 A * 5/1987 Gartzke ................. H01R 24/44 439/578
4,869,954 A 9/1989 Squitieri
5,137,959 A 8/1992 Block
5,359,768 A 11/1994 Haley
6,054,198 A 4/2000 Bunyan
6,054,520 A 4/2000 Washio
6,096,414 A 8/2000 Young
6,432,497 B2 8/2002 Bunyan
6,705,388 B1 3/2004 Sorgo
7,147,041 B2 12/2006 Mitchell
7,408,787 B2 8/2008 Matayabas, Jr.
7,473,995 B2 1/2009 Rumer
7,846,778 B2 12/2010 Rumer
8,587,945 B1 11/2013 Hartmann
9,596,788 B1 3/2017 Lai et al.
2002/0050585 A1 5/2002 Masayuki (Continued)

*Primary Examiner* — Oscar C Jimenez

(74) *Attorney, Agent, or Firm* — Alston & Bird LLP; Neal J. McLaughlin

(57) ABSTRACT

Coaxial cable adapters and connectors are provided that are particularly suited for use in high power applications. A flowable insulator filling a cavity within the adapters and connectors improves heat conduction from inner conductors outwards while providing electrical insulation around the inner conductors.

14 Claims, 5 Drawing Sheets

(56) References Cited

U.S. PATENT DOCUMENTS

| | | | | |
|---|---|---|---|---|
| 2002/0135984 | A1 | 9/2002 | Greenwood | |
| 2003/0118826 | A1 | 6/2003 | Greinke | |
| 2007/0259211 | A1 | 11/2007 | Wang | |
| 2009/0211808 | A1 * | 8/2009 | Falk | H01R 24/44 29/883 |
| 2011/0124228 | A1 * | 5/2011 | Coles | H01R 4/70 439/624 |
| 2014/0020933 | A1 | 1/2014 | Hedin | |
| 2017/0271825 | A1 * | 9/2017 | Roe | H01R 13/629 |

* cited by examiner

HIGH POWER COAXIAL ADAPTERS AND CONNECTORS

CROSS REFERENCE TO RELATED APPLICATION

This application is a continuation of U.S. patent application Ser. No. 17/133,833, filed Dec. 23, 2020, which is hereby incorporated by reference in its entirety.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The inventors extend special thanks to Michael Pelenskij for his encouragement and guidance.

BACKGROUND

Coaxial adapters and connectors are often limited in their power transmission capacity by the amount of heat that they are able to dissipate and, ultimately, withstand before material breakdowns occur and the connector fails. While heat conduction through metallic components is generally not a source of failure, metallic components in coaxial connectors are usually physically and electrically isolated from one another by air and/or a solid insulation or dielectric material. However, because conventional electrically insulative materials (including air) are typically poor heat conductors, this can result in heat generated by the transmission of electrical power and signals through internal conductors being unable to dissipate in a radial direction through the insulative material to outer metallic components, connected equipment frames or the external operating environment. Even the smallest gap between metallic components (filled by air and/or a solid electrically insulative material) can substantially hinder heat conduction in a cable connector. This failure mode is exacerbated in vacuum applications where heat conduction is particularly challenging given that voids present in a connector in a vacuum environment permit the conduction of heat at a greatly reduced rate compared to if those voids are filled with an atmospheric air composition as in a non-vacuum environment.

Some advancements have been made in developing electrically insulative materials that have improved heat conduction characteristics, for example the solid boron-based materials proposed in U.S. Pat. No. 9,596,788, which is hereby incorporated by reference in its entirety. However, there remains a need for an improved cable connector that has improved heat dissipation capabilities and is practically manufacturable.

It is the objective of the invention to provide effective solutions to observed disadvantages of existing cable adapters and connectors.

SUMMARY

The subject of this specification relates to coaxial cable adapters and connectors that are particularly suited for use in high power applications. In one embodiment, a coaxial adapter or connector includes a flowable insulator within a cavity to improve heat conduction from inner conductors outwards while providing electrical insulation around the inner conductors.

In an exemplary embodiment, a coaxial adapter comprises a first outer body, a first solid insulator within the outer body, a first inner conductor within the first solid insulator, a second inner conductor engaged with the first inner conductor, a second solid insulator surrounding the second inner conductor and enclosing a chamber within the first outer body that is also enclosed by the first solid insulator, the engagement between the first and second conductors residing within the chamber, and a flowable insulator filling the chamber.

In one example, the engagement between the first inner conductor and second inner conductor includes in a void therewithin that is filled with the flowable insulator.

In another example, the second inner conductor is a pin and the second insulator is a hermetic seal formed between the second inner conductor and the first outer body.

In still another example, the first outer body is comprised of two or more first outer body components joined together.

In still another example, a gap exists between a surface of the first solid insulator bounding the cavity and an opposing surface of the second solid insulator bounding the cavity and the flowable insulator fills the gap, separating said solid insulator surfaces.

In still another example, wherein the flowable insulator provides a heat conduction path from the engagement between the first and second conductors to the first outer body that has less resistance to heat conduction than if the cavity were filled with air instead of the flowable insulator.

In still another example, the flowable insulator is a powder. In one example, the powder comprises Boron Nitride. In another example, the powder comprises Silicon Dioxide. In still another example, the powder has an average particle size of approximately 10 microns.

In still another example, the adapter further comprises a flowable insulator within the cavity that is formed of a solid material.

In still another example, the second inner conductor is an inner conductor of a cable.

In still another example, a surface of the first solid insulator bounding the cavity is conical.

In still another example, the adapter further comprises a second outer body engaged with the first outer body, a third inner conductor engaged with the second inner conductor, a third solid insulator surrounding the third inner conductor, within the second outer body, and enclosing a second chamber between itself and the second solid insulator, and a second flowable insulator filling the second chamber.

In still another example, the engagement between the second inner conductor and third inner conductor includes in a void therewithin that is filled with the flowable insulator.

In still another example, a surface of at least one of the first outer body and second outer body is exposed to the second flowable insulator filling the second cavity.

In still another example, a surface of at least one of the second inner conductor and third inner conductor is exposed to the second flowable insulator filling the second cavity.

In another embodiment, a coaxial connector comprises a first outer body, a second outer body engaged with the first outer body, a first solid insulator within the first outer body, a first inner conductor within the first solid insulator, a second inner conductor engaged with the first inner conductor, a second solid insulator surrounding the second inner conductor, within the second outer body, and enclosing a chamber between itself and the first solid insulator, and a flowable insulator filling the chamber, wherein a surface of at least one of the first and second inner conductors is exposed to the flowable insulator filling the chamber, and a surface of at least one of the first and second outer bodies is exposed to the flowable insulator filling the chamber.

In one example, a gap exists between a surface of the first solid insulator bounding the cavity and an opposing surface of the second solid insulator bounding the cavity and the flowable insulator fills the gap, separating said solid insulator surfaces.

In another example, the engagement between the first inner conductor and second inner conductor includes in a void therewithin that is filled with the flowable insulator.

DETAILED DESCRIPTION

Embodiments of high power coaxial adapters and connectors are described herein. While aspects of the described coaxial adapters and connectors can be implemented in any number of different configurations, the embodiments are described in the context of the following exemplary configurations. The descriptions and details of well-known components and structures are omitted for simplicity of the description.

The description and figures merely illustrate exemplary embodiments of the inventive coaxial adapters and connectors. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventor to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

The present disclosure provides coaxial adapters and connectors with improved heat dissipation characteristics that is of particular utility in high power and vacuum applications. Various embodiments described herein provide an overview of the present inventions' key features. However, the designs' features are not limited to the examples and figures provided herein for illustration purposes. For instance, the examples presented and discussed herein are described in the context of a single adapter and connector interface type, however the present inventions are not so limited and may be adapted to apply to any coaxial or other cable interface.

Figure 1:
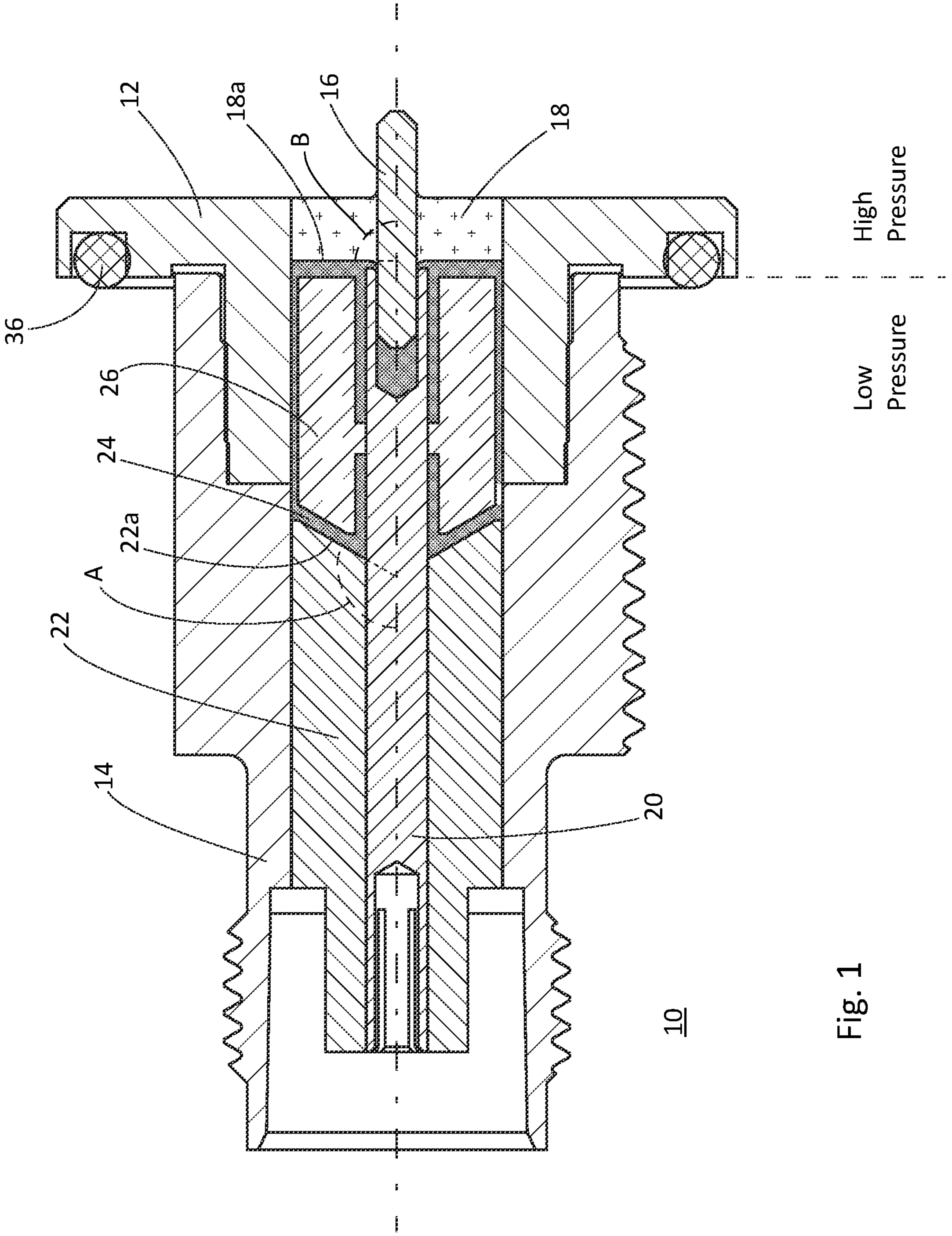
FIG. 1 shows a cross section view of a coaxial adapter according to an exemplary embodiment.

The disclosure provides, in an exemplary embodiment, shown generally in FIG. 1, a coaxial adapter 10 capable of separating low and high pressure environments (corresponding to the left and right sides, respectively, of the coaxial adapter as depicted in FIG. 1) comprising a first body 12, a second body 14, a hermetic pin 16, a hermetic sealing element 18 (providing a hermetic seal between first body 12 and second body 14), an inner conductor 20 and insulator 22 (providing electrical insulation between inner conductor 20 and second body 14). An elastomeric O-ring 36 is shown residing in a groove in first body 12, which serves to provide a seal against an adjacent panel or enclosure. Although in the embodiment shown, the adapter 10 is configured as a TNC adapter, it will be appreciated that the inventive aspects described herein are applicable to may other types of adapter interfaces as well without undue experimentation.

In one exemplary embodiment, first and second bodies 12 and 14 are formed of an electrically conductive material, for example brass. Although first and second bodies 12 and 14 are shown and described as being two separate components, it should be noted that the function of these components may be accomplished by a single body component or more than two separate body components. Similarly, two or more body components may be manufactured separately and then later joined together to form a single unitary body. For example, as shown in FIG. 1, first body 12 is configured to be press-fit into an inner bore of second body 14, thereby permanently joining the first and second bodies 12 and 14. Alternatively, first and second body may be joined by other means, including, but not limited to, a threaded engagement (an example of which is shown in the embodiment depicted in FIG. 3), welding, adhesive (which may be electrically conductive), etc. Depending on any pressure differential present in the operating environment, if the first and second bodies 12 and 14 are comprised of separate components joined together, appropriate leak prevention features and joining methods may be employed to ensure that undesirable pressure leakage through the adapter or connector does not occur.

As shown in FIG. 1, inner conductor 20 is electrically conductive and is electrically connected to pin 16, which is also electrically conductive. In one example, inner conductor 20 and pin 16 are formed of a metal, for example brass. However, inner conductor 20 and pin 16 need not be formed of the same material. Although depicted in FIG. 1 as two separate components, inner conductor 20 and pin 16 may be formed as a single component or as more than two components. Similarly, while FIG. 1 depicts a pin 16 as a male pin slidably inserted into and in contact with a female receptacle of inner conductor 20, genders may be reversed or the connection type may be different. For example, pin 16 and inner conductor 20 may be threaded together, welded, adhered together by an electrically conductive adhesive, etc. Inner conductor 20 may be configured to attach to a cable or other adapter, connector or fixture at an end thereof opposite the pin 16.

Insulator 22 electrically isolates inner conductor 20 from second body 14 and serves to center inner conductor 20 within an internal bore of second body 14. Insulator 22 may be formed of any electrically insulative material, but is preferably a solid material, or at least hardened or cured from a liquid, resin or powdered state into a solid material. Exemplary materials for insulator 22 include PTFE and Fuoroloy® H. Insulator 22 may be comprised of two or more separate and adjacent insulator components that may or may not be permanently bonded or joined together.

Within the internal bore of the first and second bodies 12 and 14, between insulator 22 and the hermetic seal 18 and pin 16, is a flowable insulator 24 formed of a flowable material such as a powder, liquid or resin. Important characteristics for a material selected for flowable insulator 24 are that it be an electric insulator of sufficient resistivity for the power anticipated to be conducted by the connector as well have a good heat transfer coefficient, for example greater than that of air. Exemplary materials for flowable insulator 24 include Boron Nitride powder and Silicon Dioxide powder. If a powder is used for flowable insulator 24, the powder is preferably of a fineness the enables it to fill and flow into any voids that may be present while not being so fine as to cause undue manufacturing challenges. Similarly, if a liquid or resin is used, its viscosity should be selected such that it is able to flow into voids freely. Voids that are preferably filled by flowable insulator 24 include any voids between pin 16 and inner conductor 22 at their connection, any internal voids between first and second bodies 12 and 14, and any voids between insulator 22 and seal 18 and pin 16. In one example, flowable insulator 24 may be formed of a powder having an average particle size of approximately 10 microns. Flowable insulator 24 may be formed of a flowable material that is able to be cured, set or hardened into a solid material after filling and flowing into voids. For example, flowable insulator 24 may be formed of an initially flowable liquid or powder material that includes a binder material that hardens the flowable material with the application of heat.

As shown in FIG. 1, an exemplary connector may optionally include a filler insulator 26 within the internal bore of the first and second bodies 12 and 14, between insulator 22 and the hermetic seal 18 and pin 16. The filler insulator 26 occupies this space together with the flowable insulator 24. The filler insulator 26 may be formed of a solid insulative material similar to that of insulator 22. The filler insulator 26 may be configured to contact any of the adjacent surfaces of the adjacent components and may also be configured such that it is spaced apart from and does not contact other surfaces. For example, in the exemplary embodiment shown in FIG. 1, filler insulator 26 is configured to contact an external surface of inner conductor 20, while being spaced apart from and not contacting insulator 22, first and second bodies 12 and 14, pin 16 and seal 18. Any spaces between filler insulator 26 and adjacent surfaces are filled with flowable insulator 24, with very minimal, and ideally no, air-filled voids.

The geometry of the portion of the internal bore of the first and second bodies 12 and 14 filled by flowable insulator 24 may also be configured to assist in providing improved thermal and electrical properties. For example, the end surface 18*a* of seal 18 and the end surface of insulator 22 may be configured to shape the confines of flowable insulator 24. In the exemplary embodiment shown in FIG. 1, end surface 18*a* is configured such that it is perpendicular (angle B is 90 degrees) to an axis of the pin 16 and inner conductor 20. End surface 18*a* may also be configured as a conical or other shaped surface. In the exemplary embodiment shown in FIG. 1, end surface 22*a* is configured to have a conical shape, with a generally consistent cone angle A around an axis of the of the pin 16 and inner conductor 20. End surface 22*a* may also be configured to have a flat, perpendicular surface similar to end surface 18*a* or any other shaped surface. In an exemplary embodiment, both end surface 18*a* and end surface 22*a* are flat surfaces that are perpendicular to an axis of the pin 16 and inner conductor 20.

The volume of gaps filled with flowable insulator 24 may also be specifically designed so as to provide desirable impedance properties. For example, the distance separating face 22*a* of insulator 22 and filler insulator 26 may be configured so as to allow a predetermined thickness of flowable insulator 24 to flow between them, that predetermined thickness of flowable insulator 24 providing a calibrated amount and quality of impedance.

Figure 2:
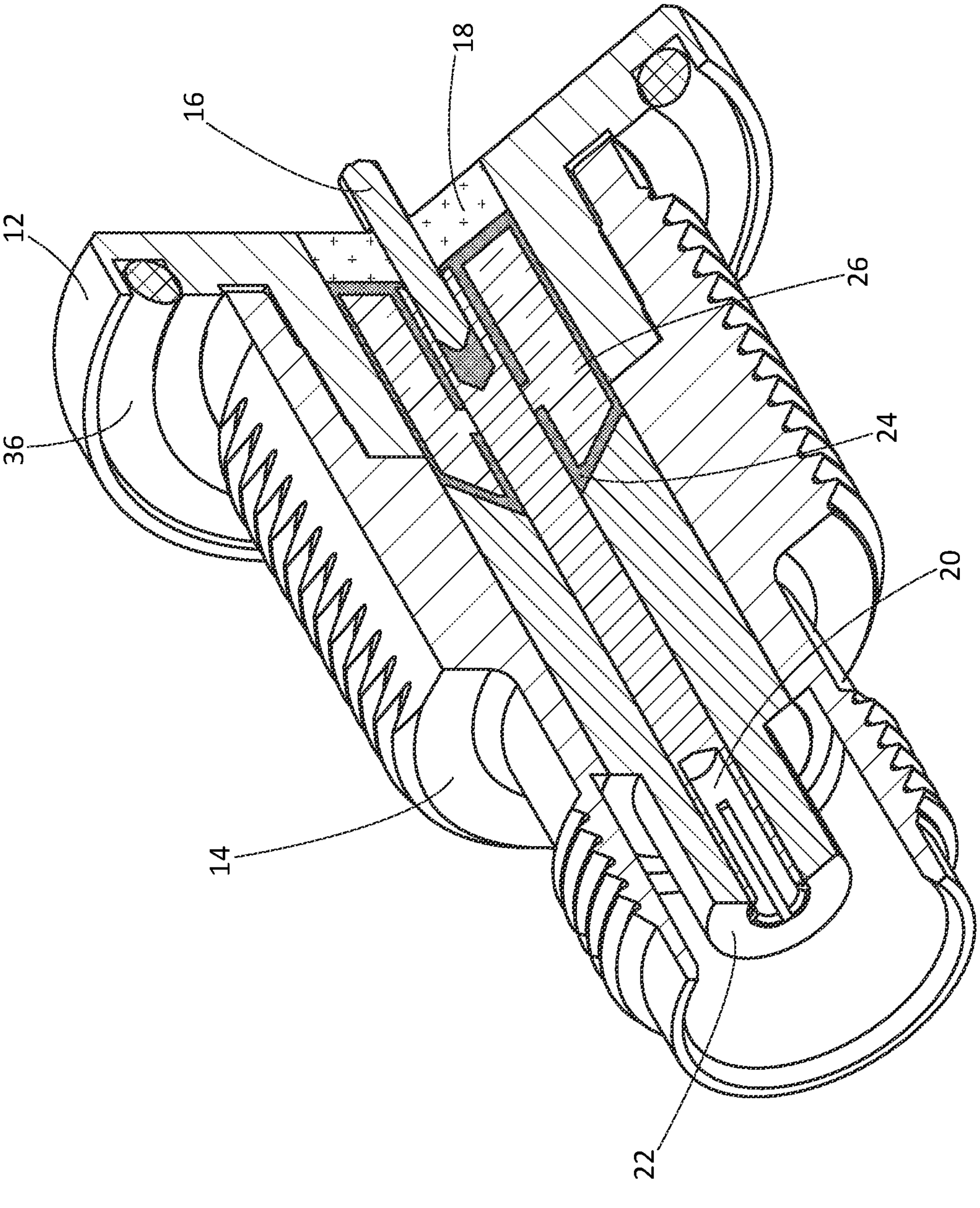
FIG. 2 is a perspective view of a partial cross section of the exemplary adapter shown in FIG. 1.

FIG. 2 is a perspective view of a partial cross section of the exemplary connector shown in FIG. 1.

Figure 3:
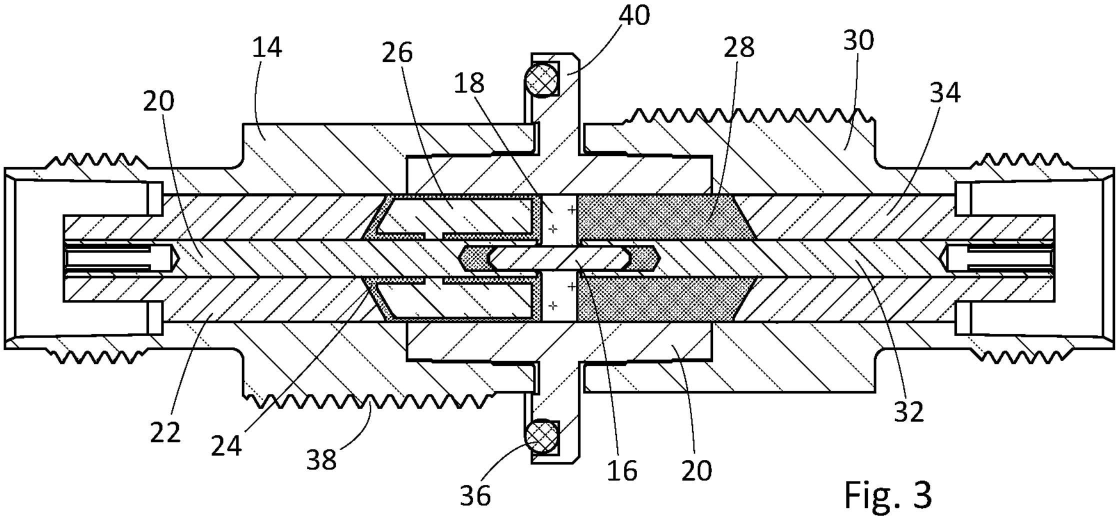
FIG. 3 shows a cross section view of a coaxial connector according to another exemplary embodiment.
Figure 4:
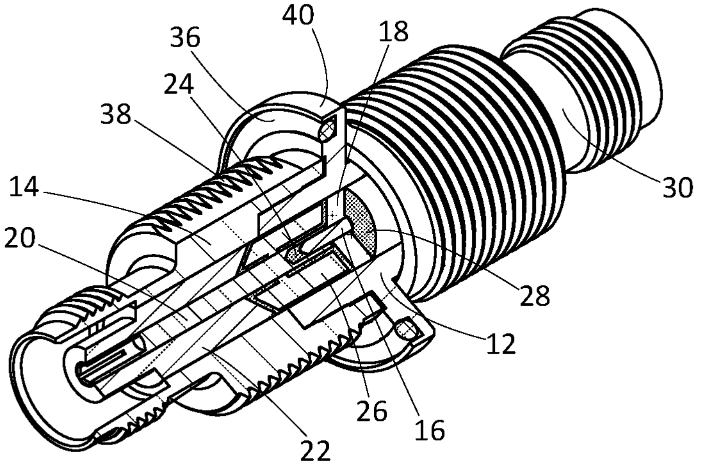
FIG. 4 is a perspective view of a partial cross section view of a the exemplary connector shown in FIG. 3.

FIG. 3 shows a cross section view of a coaxial connector according to another exemplary embodiment. As shown in FIG. 3, a coaxial connector may include multiple flowable insulators. For example, the left portion of the connector shown in FIG. 3 generally corresponds to the connector shown in FIG. 1, with some differences.

The exemplary connector shown in FIG. 3 includes components assembled opposite the pin 16 and seal 18 from the first flowable insulator 24. These include a second flowable insulator 28, a third body 30, a second inner conductor 32 and a second insulator 34.

In one exemplary embodiment, third body 30 is formed of an electrically conductive material, for example brass. Although first and third bodies 12 and 30 are shown and described as being two separate components, it should be noted that the function of these components may be accomplished by a single body component or more than two separate body components. Similarly, two or more body components may be manufactured separately and then later joined together to form a single unitary body. For example, as shown in FIG. 3, first body 12 is configured to be threaded into mating threads of third body 30, thereby reversibly joining the first and third bodies 12 and 30. Alternatively, the bodies may be joined by other permanent or removable means, including, but not limited to, a press-fit engagement (an example of which is shown in the embodiment depicted in FIG. 1), welding, adhesive (which may be electrically conductive), etc.

In the embodiment shown in FIG. 3, second flowable insulator 28 occupies the internal cavity defined by seal 18, pin 16, first and third bodies 12 and 30, second insulator 34 and second inner conductor 28. In particular, second flowable insulator occupies any voids present in the connection of pin 16 and second inner conductor 32, in a similar fashion to how flowable insulator 24 fills voids between pin 16 and inner conductor 20 as shown and described with respect to FIG. 1.

In the embodiment shown in FIG. 3, the end of inner conductor 20 opposite pin 16 and the end of second inner conductor 32 are configured for attachment to external cables or connectors, with optional internal or external threads on second and third bodies 14 and 30 being configured to assist in such attachment. The connector shown in FIG. 3 is also shown as being configured to attach to a panel or device enclosure. For example, as shown in FIG. 3, an external thread 38 is configured to receive a nut (not pictured) in threaded engagement with second body 14 so as to fix the connector to a panel or enclosure wall sandwiched between the nut and a flange 40 of first body 12 (and optional elastomeric O-ring 36 residing in a groove thereof). Of course, it will be appreciated that the engagement or location of the nut-engaging thread 38 and flange 40 may be configured on any of the first, second or third bodies 12, 14 or 30.

Figure 5:
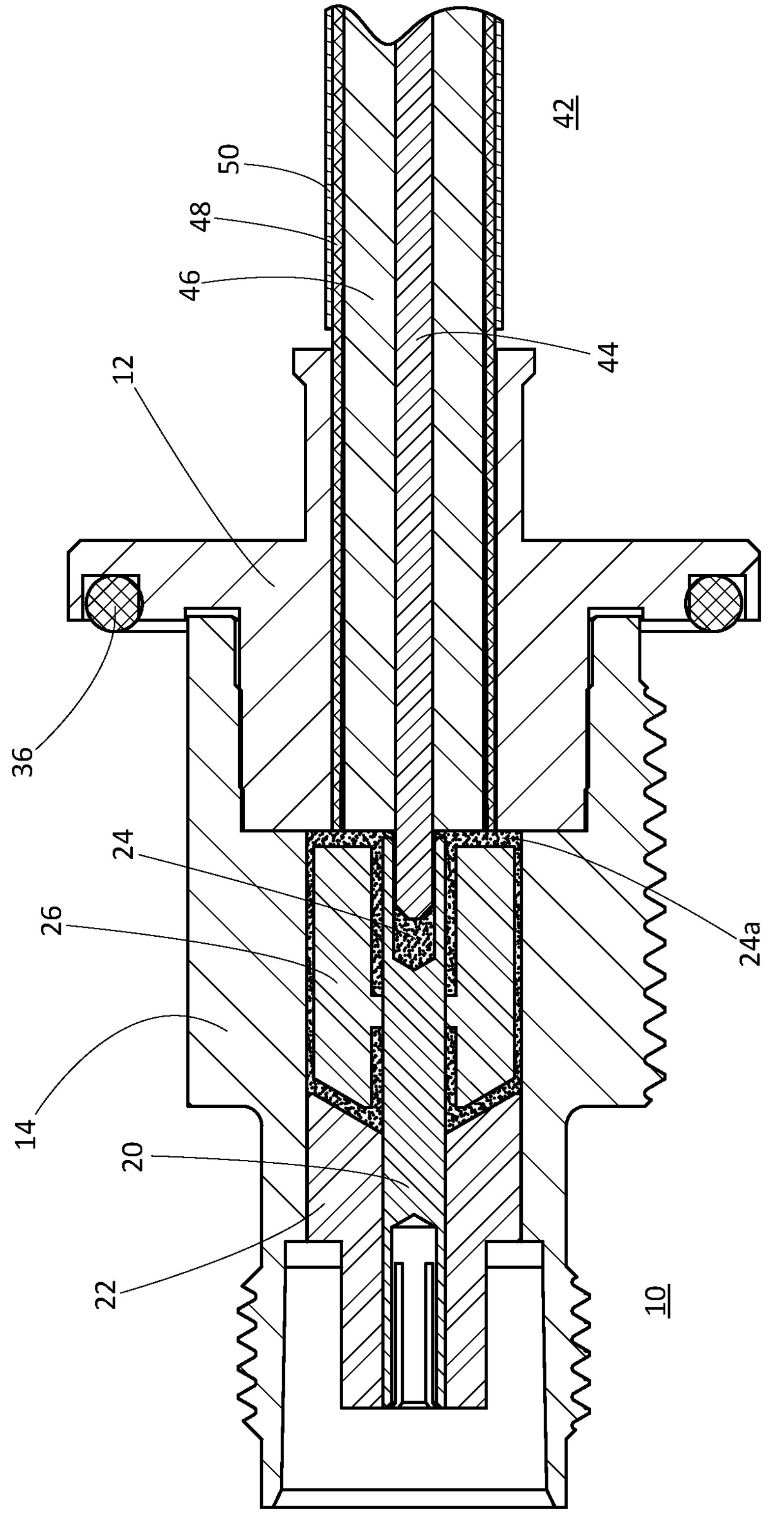
FIG. 5 shows a cross section view of a coaxial connector according to another exemplary embodiment.

In another embodiment, shown in FIG. 5, a coaxial connector 10 is attached to a coaxial cable 42. The cable 42 is comprised of an inner conductor 44, a cable insulator 46, shielding 48 and an outer jacket 50. The first body 12 may be crimped or otherwise joined to the cable 42. As one example, shielding 48 may be soldered to the internal bore of first body 12 as a means of joining that also provides electrical conductivity between the shielding 48 and the first body 12.

A flowable insulator 24 may occupy the cavities and voids around the connection between inner conductor 20 and cable conductor 42. For example, as shown in FIG. 5, the flowable insulator 24 may occupy the cavity 24*a* between an end of the cable insulator 46 and shielding 48 on one side and a filler insulator 26 on the other. This flowable insulator 24 filled cavity 24*a* may also be bounded by surfaces of the first and/or second bodies (12 and/or 14). The flowable insulator 24 may provide a heat conduction path from the connection between inner conductor 20 and cable conductor 44 to the first and/or second bodies (12 and/or 14). In other words, the flowable insulator 24 may be configured to physically contact inner conductor 20 and cable conductor 44 and the connection therebetween and also the first and/or second bodies (12 and/or 14). By physically contacting these components, the flowable insulator 24 provides better heat conduction away from the connection between inner conductor 20 and cable conductor 44 than would have been possible if the same space was filled with a vacuum or even air.

Figure 6:
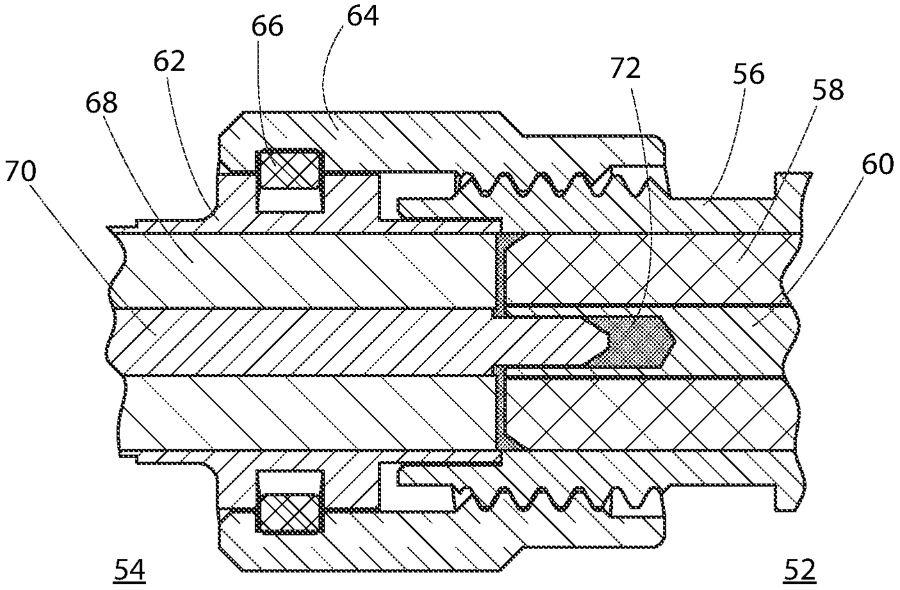
FIG. 6 shows a cross section view of a coaxial connector according to another exemplary embodiment.

In another embodiment, shown in FIG. 6, SMA-type engaged male and female connectors are shown (52 and 54, respectively). In the example shown, the male connector 52 includes a male threaded body 56, an insulator 58 and an inner conductor 60. The female connector 54 includes a base body 62, a female threaded nut 64 that is held captive to (by is permitted to rotate about the connector axis) the base body 62 by retaining ring 66, an insulator 68 and an inner conductor 70. A flowable insulator 72 fills a cavity in and around the connection between inner conductors 60 and 70. As shown, there may be a gap between the insulators 58 and 68 that is filled with flowable insulator 72. The distance and shape of this gap may be calibrated based on material properties of the flowable insulator 72 to provide a desired impedance through the connector.

Figure 7:
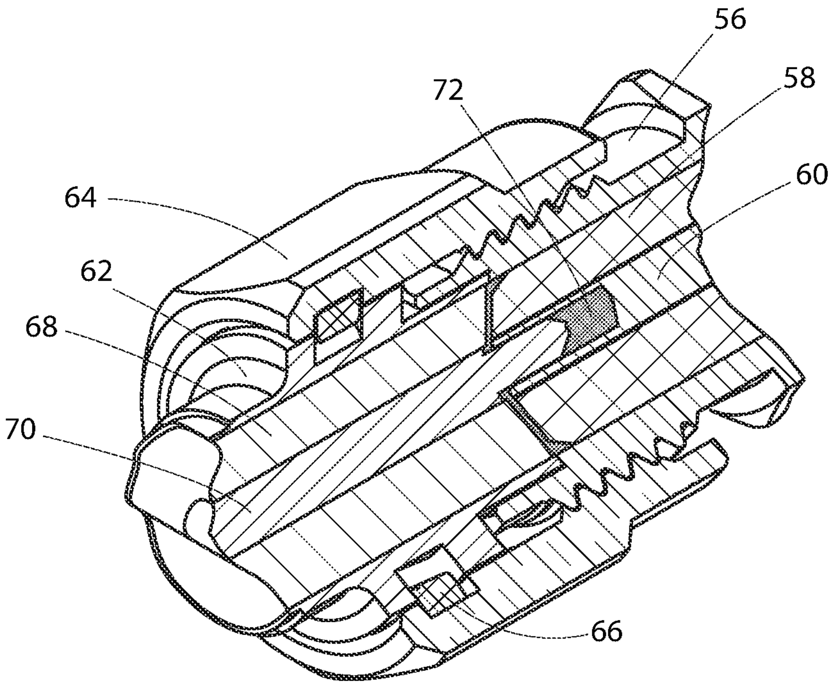
FIG. 7 is a perspective view of a partial cross section view of a the exemplary connector shown in FIG. 6.

FIG. 7 is a perspective view of a partial cross section view of a the exemplary connector shown in FIG. 6.

In order to address various issues and advance the art, the entirety of this application (including the Cover Page, Title, Headings, Background, Summary, Brief Description of the Drawings, Detailed Description, Claims, Abstract, Figures, and otherwise) shows, by way of illustration, various embodiments in which the claimed present subject matters may be practiced. The advantages and features of the application are of a representative sample of embodiments only, and are not exhaustive and/or exclusive. They are presented only to assist in understanding and teach the claimed principles. It should be understood that they are not representative of all claimed present subject matters. As such, certain aspects of the disclosure have not been discussed herein. That alternative embodiments may not have been presented for a specific portion of the present subject matter or that further undescribed alternate embodiments may be available for a portion is not to be considered a disclaimer of those alternate embodiments. It may be appreciated that many of those undescribed embodiments incorporate the same principles of the present subject matters and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. Also, some of these embodiments and features thereof may be mutually contradictory, in that they cannot be simultaneously present in a single embodiment. Similarly, some features are applicable to one aspect of the present subject matter, and inapplicable to others. In addition, the disclosure includes other present subject matters not presently claimed. Applicant reserves all rights in those presently unclaimed present subject matters including the right to claim such present subject matters, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a cable connector user, various embodiments of the connector and installation thereof may be implemented that enable a great deal of flexibility and customization.

What is claimed is:

1. A coaxial adapter comprising:
- a first outer body,
- a first solid insulator within the outer body,
- a first inner conductor within the first solid insulator,
- a second inner conductor engaged with the first inner conductor,
- a second solid insulator surrounding the second inner conductor and enclosing a chamber within the first outer body that is also enclosed by the first solid insulator, the engagement between the first and second conductors residing within the chamber, and
- a flowable insulator filling the chamber around the engagement between the first and second conductors.

2. The adapter of claim 1 wherein the second inner conductor is a pin and the second insulator is a hermetic seal formed between the second inner conductor and the first outer body.

3. The adapter of claim 1 wherein the first outer body is comprised of two or more first outer body components joined together.

4. The adapter of claim 1, wherein a gap exists between a surface of the first solid insulator bounding the cavity and an opposing surface of the second solid insulator bounding the cavity and the flowable insulator fills the gap, separating said solid insulator surfaces.

5. The adapter of claim 1, wherein the flowable insulator provides a heat conduction path from the engagement between the first and second conductors to the first outer body that has less resistance to heat conduction than if the cavity were filled with air instead of the flowable insulator.

6. The adapter of claim 1, wherein the flowable insulator is a powder.

7. The adapter of claim 6, wherein the powder comprises Boron Nitride.

8. The adapter of claim 6, wherein the powder comprises Silicon Dioxide.

9. The adapter of claim 6, wherein the powder has an average particle size of approximately 10 microns.

10. The adapter of claim 1, further comprising a flowable insulator within the cavity that is formed of a solid material.

11. The adapter of claim 1, wherein the second inner conductor is an inner conductor of a cable.

12. The adapter of claim 1, wherein a surface of the first solid insulator bounding the cavity is conical.

13. A coaxial connector, comprising:

a first outer body, a second outer body engaged with the first outer body, a first solid insulator within the first outer body, a first inner conductor within the first solid insulator, a second inner conductor engaged with the first inner conductor, a second solid insulator surrounding the second inner conductor, within the second outer body, and enclosing a chamber between itself and the first solid insulator, and a flowable insulator filling the chamber around the engagement between the first and second inner conductors, wherein a surface of at least one of the first and second inner conductors is exposed to the flowable insulator filling the chamber, and a surface of at least one of the first and second outer bodies is exposed to the flowable insulator filling the chamber.

14. The connector of claim 13, wherein a gap exists between a surface of the first solid insulator bounding the cavity and an opposing surface of the second solid insulator bounding the cavity and the flowable insulator fills the gap, separating said solid insulator surfaces.

* * * * *